United States Patent
Ruan et al.

(10) Patent No.: US 9,924,407 B2
(45) Date of Patent: Mar. 20, 2018

(54) CONTENTION ADJUSTMENT METHOD, APPARATUS, AND SYSTEM IN WIRELESS LOCAL AREA NETWORK

(71) Applicant: Huawei Technologies Co., Ltd., Shenzhen (CN)

(72) Inventors: Wei Ruan, Suzhou (CN); Xiaobing Wan, Suzhou (CN); Mingyue Wang, Suzhou (CN); Hongyi Tan, Suzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 186 days.

(21) Appl. No.: 14/978,982

(22) Filed: Dec. 22, 2015

(65) Prior Publication Data

US 2016/0183122 A1  Jun. 23, 2016

(30) Foreign Application Priority Data

Dec. 23, 2014  (CN) .......................... 2014 1 0812267

(51) Int. Cl.
*H04W 28/02*  (2009.01)
*H04W 28/22*  (2009.01)
(Continued)

(52) U.S. Cl.
CPC ... *H04W 28/0289* (2013.01); *H04W 28/0205* (2013.01); *H04W 28/0231* (2013.01);
(Continued)

(58) Field of Classification Search
CPC ......... H04W 28/0289; H04W 28/0205; H04W 28/22; H04W 28/0231; H04W 76/048; H04W 74/08; H04L 47/32
See application file for complete search history.

(56) References Cited

U.S. PATENT DOCUMENTS

2002/0015388 A1  2/2002 Kim et al.
2006/0187895 A1*  8/2006 Nandagopalan ........ H04L 47/14
370/345

(Continued)

FOREIGN PATENT DOCUMENTS

EP  2785103 A1  10/2014

OTHER PUBLICATIONS

Foreign Communication From A Counterpart Application, European Application No. 15202644.9, Extended European Search Report dated May 12, 2016, 9 pages.
(Continued)

*Primary Examiner* — Kwang B Yao
*Assistant Examiner* — Moo Ryong Jeong
(74) *Attorney, Agent, or Firm* — Conley Rose, P.C.

(57) ABSTRACT

A contention adjustment method for use in an apparatus and a system in a wireless local area network. The method includes acquiring an air interface occupancy time ratio of a terminal that is in a service operating state, and adjusting an uplink data sending threshold of the terminal according to the air interface occupancy time ratio of the terminal, where the air interface occupancy time ratio of the terminal is a ratio of an air interface occupancy time of the terminal to an air interface time, and the air interface occupancy time of the terminal is a ratio of a volume of data sent by the terminal to an air interface data sending rate of the terminal in the air interface time. The present disclosure may avoid that a terminal with a stronger demand excessively preempts a terminal with a weaker demand.

10 Claims, 3 Drawing Sheets

(51) Int. Cl.
*H04W 74/08* (2009.01)
*H04W 76/04* (2009.01)
*H04L 12/823* (2013.01)

(52) U.S. Cl.
CPC ........... *H04W 28/22* (2013.01); *H04W 74/08* (2013.01); *H04W 76/048* (2013.01); *H04L 47/32* (2013.01)

(56) References Cited

U.S. PATENT DOCUMENTS

| 2014/0105026 | A1 | 4/2014 | Wanstedt et al. |
| 2014/0269580 | A1 | 9/2014 | Huang et al. |
| 2016/0043953 | A1* | 2/2016 | Ringland .......... H04W 28/0231 370/230 |
| 2016/0345080 | A1* | 11/2016 | Saikusa ................ H04W 76/04 |

OTHER PUBLICATIONS

Foreign Communication From A Counterpart Application, European Application No. 15202644.9, European Office Action dated Oct. 2, 2017, 5 pages.

\* cited by examiner

CONTENTION ADJUSTMENT METHOD, APPARATUS, AND SYSTEM IN WIRELESS LOCAL AREA NETWORK

CROSS-REFERENCE TO RELATED APPLICATION

This application claims priority to Chinese Patent Application No. 201410812267.0, filed on Dec. 23, 2014, which is hereby incorporated by reference in its entirety.

TECHNICAL FIELD

This application relates to the field of communications, and in particular, to a contention adjustment method, apparatus, and system in a wireless local area network.

BACKGROUND

With rapid development of the mobile Internet, users have increasingly high demands for mobile high-speed data access. As a low-cost and high-bandwidth wireless access technology, a wireless local area network (WLAN) has been deployed in a large scale and applied widely by domestic and overseas operators.

In a process of using the WLAN, a situation in which multiple terminals (Stations (STAs)) access a same access point (AP) often occurs, and a situation in which multiple STAs simultaneously need to send data to a same AP also often occurs. The multiple STAs cannot send uplink data simultaneously due to a restriction on an available frequency band allocated to the STAs and the AP. In this case, a backoff mechanism may be employed among the multiple STAs to determine which STA sends data at a moment.

The backoff mechanism refers to that all STAs accessing a same AP share a time domain and a frequency domain, and in the time domain, only one STA can send data at a same moment, while all other STAs wait for sending data, that is, all the other STAs perform backoff. After a current STA completes data sending and after an interval of one distributed interframe space (DIFS), all the STAs contend in a contention window (CW), and a STA with a strongest contention capability obtains, by means of contention, an opportunity for sending data, while other STAs continue to wait for sending data.

There are many factors that determine a contention capability of a STA, such as signal quality, a processing speed, signal strength, and a demand, among which a primary factor that determines the contention capability of the STA is the demand, that is, the STA has a demand for sending data. Generally, in a case in which other factors are the same, a stronger demand of the STA indicates a higher probability that the STA obtains, by means of contention, an opportunity for sending data. For an AP, if an actual data sending rate of a STA is greater, it may be considered that the STA has a higher demand.

In a case in which other factors are the same, if some STAs have stronger demands, probabilities that these STAs obtain, by means of contention, opportunities for sending data are higher. Conversely, if some STAs have weaker demands, probabilities that these STAs obtain, by means of contention, opportunities for sending data are lower. A delay of sending data by a STA with a relatively low demand is relatively large due to waiting for multiple times, and in an extreme situation, sending may fail because of always failing to obtain, by means of contention, an opportunity for sending data, which causes quite poor experience to a user of a terminal.

It can be seen that, in the prior art, contention among terminals is mostly adjusted according to a contention window, and demands of the terminals are not adjusted, thereby causing that a terminal with a higher demand excessively preempts a terminal with a lower demand, and leading to poor experience when the terminals are used.

SUMMARY

Embodiments of the present disclosure provide a contention adjustment method, which can resolve a problem that a terminal with a higher demand excessively preempts a terminal with a lower demand.

To resolve the foregoing technical problem, the embodiments of the present disclosure disclose the following technical solutions:

According to a first aspect, a contention adjustment method is provided, where the method is applied to an access point, and the method includes acquiring an air interface occupancy time ratio of a terminal that is in a service operating state, and adjusting an uplink data sending threshold of the terminal according to the air interface occupancy time ratio of the terminal, where the air interface occupancy time ratio of the terminal is a ratio of an air interface occupancy time of the terminal to an air interface time, and the air interface occupancy time of the terminal is a ratio of a volume of data sent by the terminal to an air interface data sending rate of the terminal in the air interface time.

With reference to the first aspect, in a first possible implementation manner of the first aspect, before the acquiring an air interface occupancy time ratio of a terminal that is in a service operating state, the method further includes detecting a quantity of uplink service packets of the terminal, acquiring an uplink service packet sending frequency of the terminal according to the quantity of uplink service packets of the terminal, where the uplink service packet sending frequency is a quantity of uplink service packets of the terminal in a unit time, and determining a service status of the terminal, where if the packet sending frequency of the terminal is greater than or equal to a first threshold, the terminal is in a service operating state, and if the packet sending frequency of the terminal is less than the first threshold, the terminal is in a service shortage state.

With reference to the first aspect, in a second possible implementation manner of the first aspect, the adjusting an uplink data sending threshold of the terminal according to the air interface occupancy time ratio of the terminal includes if the air interface occupancy time ratio of the terminal is less than a second threshold, increasing the uplink data sending threshold of the terminal, and if the air interface occupancy time ratio of the terminal is greater than or equal to the second threshold, acquiring a channel idle rate of the access point, and maintaining or decreasing the uplink data sending threshold of the terminal according to the channel idle rate of the access point.

With reference to the second possible implementation manner of the first aspect, in the third possible implementation manner of the first aspect, the maintaining or decreasing the uplink data sending threshold of the terminal according to the channel idle rate of the access point includes if the channel idle rate is greater than or equal to a third threshold, maintaining the uplink data sending threshold of the terminal, and if the channel idle rate is less than the third threshold, decreasing the uplink data sending threshold of the terminal.

With reference to the third possible implementation manner of the first aspect, in a fourth possible implementation manner of the first aspect, after the decreasing the uplink data sending threshold of the terminal, the method further includes detecting an actual data sending rate of the terminal, comparing the actual data sending rate of the terminal with the uplink data sending threshold, and if the actual data sending rate of the terminal is greater than or equal to the uplink data sending threshold, performing discontinuous packet dropping on received data that is sent by the terminal, and sending, to an upper layer protocol of the access point in a delayed manner, data that has undergone the discontinuous packet dropping, and detecting the discontinuous packet dropping and a delay of the terminal, and if the discontinuous packet dropping and the delay are detected, negotiating with the terminal, so that the terminal decreases a data sending rate until an actual data sending rate of the terminal is less than or equal to the uplink data sending threshold.

According to another aspect, a contention adjustment apparatus is provided, where the apparatus includes an air interface occupancy time ratio acquiring unit, configured to acquire an air interface occupancy time ratio of a terminal that is in a service operating state, and an adjusting unit, configured to adjust an uplink data sending threshold of the terminal according to the air interface occupancy time ratio of the terminal, where the air interface occupancy time ratio of the terminal is a ratio of an air interface occupancy time of the terminal to an air interface time, and the air interface occupancy time of the terminal is a ratio of a volume of data sent by the terminal to an air interface data sending rate of the terminal in the air interface time.

With reference to the second aspect, in a first possible implementation manner of the second aspect, the apparatus further includes a service packet detecting unit, configured to detect a quantity of uplink service packets of each terminal, a packet sending frequency acquiring unit, configured to acquire an uplink service packet sending frequency of each terminal according to the quantity of uplink service packets of each terminal, where the uplink service packet sending frequency is a quantity of uplink service packets of the terminal in a unit time, and a service status determining unit, configured to determine a service status of each terminal, where if the packet sending frequency of the terminal is greater than or equal to a first threshold, the terminal is in a service operating state, and if the packet sending frequency of the terminal is less than the first threshold, the terminal is in a service shortage state.

With reference to the second aspect, in a second possible implementation manner of the second aspect, the adjusting unit is configured to: if the air interface occupancy time ratio of the terminal is less than a second threshold, increase the uplink data sending threshold of the terminal, and the adjusting unit is configured to: if the air interface occupancy time ratio of the terminal is greater than or equal to the second threshold, acquire a channel idle rate of an access point, and maintain or decrease the uplink data sending threshold of the terminal according to the channel idle rate of the access point.

With reference to the second possible implementation manner of the second aspect, in a third possible implementation manner of the second aspect, the adjusting unit is configured to: if the channel idle rate is greater than or equal to a third threshold, maintain the uplink data sending threshold of the terminal, and the adjusting unit is configured to: if the channel idle rate is less than the third threshold, decrease the uplink data sending threshold of the terminal.

With reference to the third possible implementation manner of the second aspect, in a fourth possible implementation manner of the second aspect, the apparatus further includes an actual data sending rate detecting unit, configured to detect an actual data sending rate of the terminal, a processing unit, configured to: compare the actual data sending rate of the terminal with the uplink data sending threshold, and if the actual data sending rate of the terminal is greater than or equal to the uplink data sending threshold, perform discontinuous packet dropping on received data that is sent by the terminal, and send, to an upper layer protocol of the access point in a delayed manner, data that has undergone the discontinuous packet dropping, and a rate decreasing unit, configured to detect the discontinuous packet dropping and a delay of the terminal, and if the discontinuous packet dropping and the delay are detected, negotiate with the terminal, so that the terminal decreases a data sending rate until an actual data sending rate of the terminal is less than or equal to the uplink data sending threshold.

According to a third aspect, a wireless local area network system is provided, including a terminal and a contention adjustment apparatus, where the contention adjustment apparatus includes an air interface occupancy time ratio acquiring unit, configured to acquire an air interface occupancy time ratio of a terminal that is in a service operating state, and an adjusting unit, configured to adjust an uplink data sending threshold of the terminal according to the air interface occupancy time ratio of the terminal, where the air interface occupancy time ratio of the terminal is a ratio of an air interface occupancy time of the terminal to an air interface time, and the air interface occupancy time of the terminal is a ratio of a volume of data sent by the terminal to an air interface data sending rate of the terminal in the air interface time.

With reference to the third aspect, in a first possible implementation manner of the third aspect, the adjusting unit is configured to: if the air interface occupancy time ratio of the terminal is less than a second threshold, increase the uplink data sending threshold of the terminal, and the adjusting unit is configured to: if the air interface occupancy time ratio of the terminal is greater than or equal to the second threshold, acquire a channel idle rate of an access point, and maintain or decrease the uplink data sending threshold of the terminal according to the channel idle rate of the access point.

With reference to the first possible implementation manner of the third aspect, in a second possible implementation manner of the third aspect, the adjusting unit is configured to if the channel idle rate is greater than or equal to a third threshold, maintain the uplink data sending threshold of the terminal, and the adjusting unit is configured to: if the channel idle rate is less than the third threshold, decrease the uplink data sending threshold of the terminal.

The embodiments of the present disclosure disclose a contention adjustment method. First, an air interface occupancy time ratio of a terminal that is in a service operating state is acquired, and then an uplink data sending threshold of the terminal is adjusted according to the air interface occupancy time ratio of the terminal, so as to adjust a demand of the terminal, thereby avoiding that a terminal with a stronger demand excessively preempts a terminal with a lower demand, and improving using experience of users of the terminals.

It should be understood that, the foregoing general description and a description of details below are merely exemplary, and do not limit the protection scope of the present disclosure.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following embodiments of the present disclosure provide a contention adjustment method, apparatus, and system, which can avoid that a terminal with a stronger demand excessively preempts a terminal with a lower demand, and improve using experience of users of the terminals.

The following clearly describes the technical solutions in the embodiments of the present disclosure with reference to the accompanying drawings in the embodiments of the present disclosure. The described embodiments are merely a part rather than all of the embodiments of the present disclosure. All other embodiments obtained by a person of ordinary skill in the art based on the embodiments of the present disclosure without creative efforts shall fall within the protection scope of the present disclosure.

Figure 1:
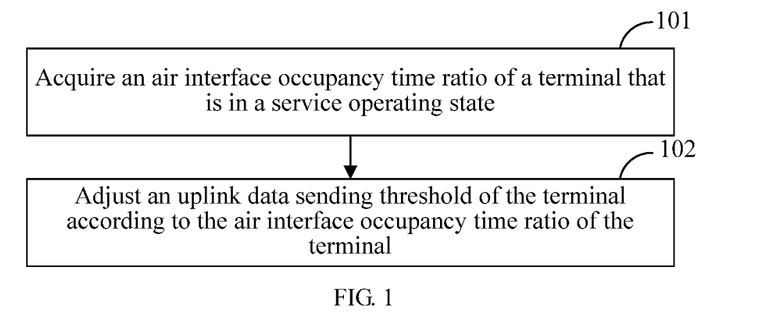
FIG. 1 is a flowchart of a contention adjustment method according to an embodiment of the present disclosure.

FIG. 1 shows a flowchart of a contention adjustment method according to an embodiment of the present disclosure. As shown in FIG. 1, the method includes the following steps:

Step 101: Acquire an air interface occupancy time ratio of a terminal that is in a service operating state.

The air interface occupancy time ratio of the terminal is a ratio of an air interface occupancy time of the terminal to an air interface time, and the air interface occupancy time of the terminal is a ratio of a volume of data sent by the terminal to an air interface data sending rate of the terminal in the air interface time.

Step 102: Adjust an uplink data sending threshold of the terminal according to the air interface occupancy time ratio of the terminal.

The uplink data sending threshold of the terminal is an upper limit of an actual data sending rate of the terminal. For an AP, a decrease in the uplink data sending threshold of the terminal means a decrease in a demand of the terminal. Therefore, by adjusting the uplink data sending threshold of the terminal, the demand of the terminal can be adjusted, that a terminal with a stronger demand excessively preempts a terminal with a lower demand can be avoided, and using experience of users can be improved.

In this embodiment of the present disclosure, before acquiring an air interface occupancy time ratio of a terminal that is in a service operating state, the method further includes detecting a quantity of uplink service packets of each terminal, acquiring an uplink service packet sending frequency of each terminal according to the quantity of uplink service packets of the terminal. The uplink service packet sending frequency is a quantity of uplink service packets of the terminal in a unit time. The method further includes determining a service status of the terminal. If the packet sending frequency of the terminal is greater than or equal to a first threshold, the terminal is in a service operating state. If the packet sending frequency of the terminal is less than the first threshold, the terminal is in a service shortage state.

The first threshold may be set according to a network status, a quantity of STAs accessing the AP, and the like. In this embodiment of the present disclosure, adjustment of the uplink data sending threshold is not considered for a terminal that is in a service shortage state, but is considered only for a terminal that is in a service state, which can reduce system resources and improve a system operating speed.

In step 102, the adjusting an uplink data sending threshold of the terminal according to the air interface occupancy time ratio of the terminal includes if the air interface occupancy time ratio of the terminal is less than a second threshold, increasing the uplink data sending threshold of the terminal, and if the air interface occupancy time ratio of the terminal is greater than or equal to the second threshold, acquiring a channel idle rate of the access point, and maintaining or decreasing the uplink data sending threshold of the terminal according to the channel idle rate of the access point.

In this embodiment of the present disclosure, the second threshold may be calculated according to the quantity of STAs accessing the AP. For example, if there are N STAs accessing the AP, the second threshold may be 1/N. The second threshold may also be separately set according to an actual situation.

The air interface occupancy time ratio of the terminal indicates a channel occupancy situation of the terminal. If the air interface occupancy time ratio of the terminal is less than the second threshold, it may be considered that a channel occupancy time of the terminal is relatively short, and more opportunities for sending data may further be provided to the STA, and therefore, the uplink data sending threshold of the STA is increased to increase a demand of the STA.

If the air interface occupancy time ratio of the terminal is greater than or equal to the second threshold, it may be considered that the channel occupancy time of the STA is relatively long, and further processing needs to be performed according to the channel idle rate, which is specifically as follows:

The maintaining or decreasing the uplink data sending threshold of the terminal according to the channel idle rate of the access point includes if the channel idle rate is greater than or equal to a third threshold, maintaining the uplink data sending threshold of the terminal; and if the channel idle rate is less than the third threshold, decreasing the uplink data sending threshold of the terminal.

The channel idle rate is used to represent an idleness degree of a channel. If the channel idle rate is greater than or equal to the third threshold, it may be considered that the channel is relatively idle, and for a terminal with a relatively large air interface occupancy time ratio, an uplink data sending threshold of the terminal may be maintained. If the channel idle rate is less than the third threshold, it may be considered that the channel is relatively busy, and for a terminal with a relatively large air interface occupancy time ratio, a corresponding uplink data sending threshold of the terminal needs to be decreased to reduce a demand of the terminal.

After the decreasing the uplink data sending threshold of the terminal, the method further includes detecting an actual data sending rate of the terminal and comparing the actual data sending rate of the terminal with the uplink data sending threshold. If the actual data sending rate of the terminal is greater than or equal to the uplink data sending threshold, performing discontinuous packet dropping on received data that is sent by the terminal, and sending, to an upper layer protocol in a delayed manner, data that has undergone the discontinuous packet dropping. The method further includes detecting the discontinuous packet dropping and a delay of the terminal. If the discontinuous packet dropping and the delay are detected, negotiating with the terminal so that the terminal decreases a data sending rate until an actual data sending rate of the terminal is less than or equal to the uplink data sending threshold.

The contention adjustment method according to this embodiment of the present disclosure is actually a dynamic adjustment process. In this embodiment of the present disclosure, adjustment of a demand of the terminal is a periodic process. In each adjustment period, the uplink data sending threshold of the terminal is adjusted according to the air interface occupancy time ratio of the terminal, so as to adjust the demand of the terminal, and avoid that a terminal with a stronger demand excessively preempts a terminal with a weaker demand.

In an actual application, in a case in which demands of terminals are basically the same, higher signal strength of a STA indicates a stronger contention capability of the STA. That is, in a case in which demands of terminals are basically the same, a STA with higher signal strength has a higher probability of obtaining, by means of contention, an opportunity for sending data. However, in a case in which demands are basically the same, a STA with high signal strength may have a relatively small actual data sending rate after obtaining, by means of contention, a sending opportunity, which causes that a data receiving rate of an AP within a period of time is relatively low, thereby affecting data transmission efficiency of an entire network and affecting performance of the entire network.

In this embodiment of the present disclosure, an uplink data sending threshold of a terminal is adjusted, and an actual data sending rate of the terminal is also detected, which can avoid a situation in which a terminal with a relatively strong demand has a small actual data sending rate within a period of time, and can increase an actual data receiving rate of an AP, thereby improving data transmission efficiency of an entire network, and improving performance of the entire network.

Figure 2:
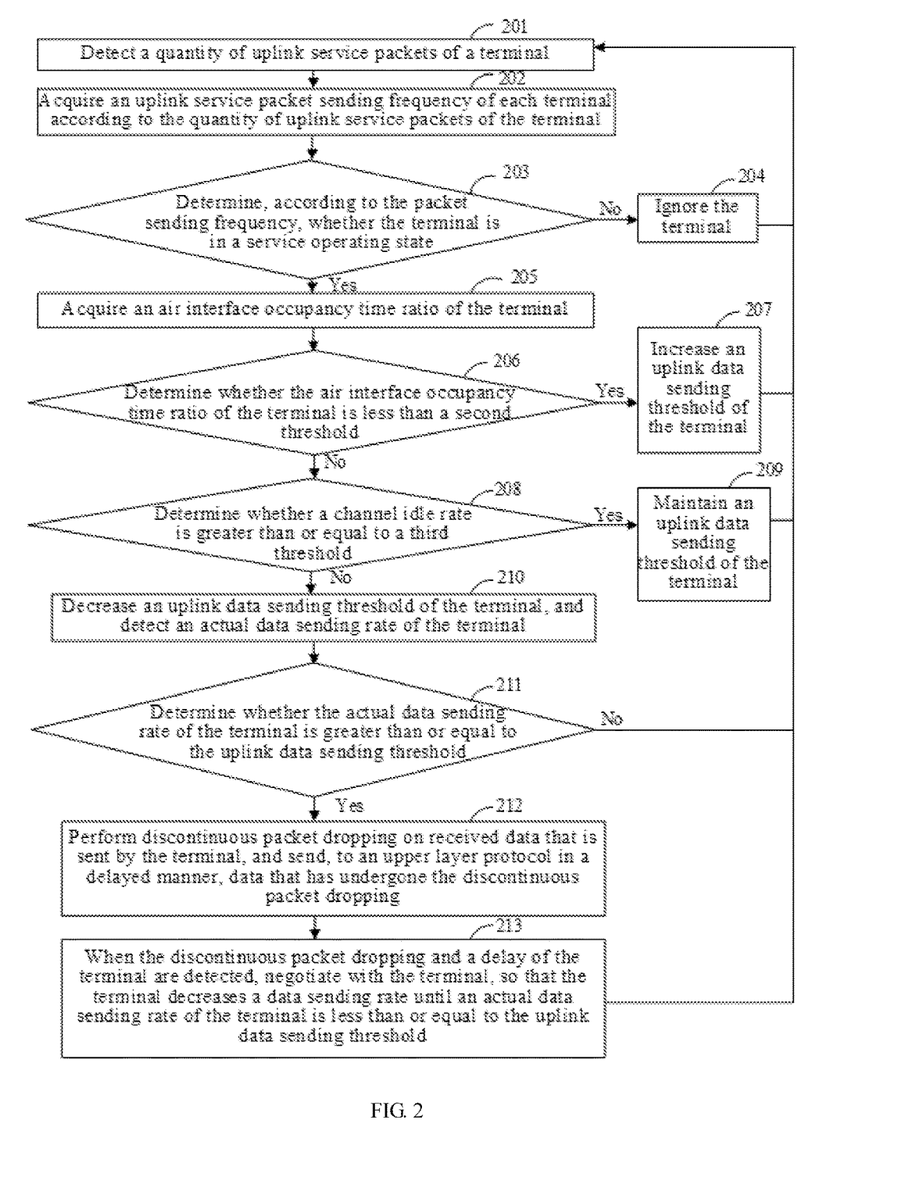
FIG. 2 is a flowchart of a contention adjustment method according to an embodiment of the present disclosure.

FIG. 2 shows a flowchart of a contention adjustment method according to an embodiment of the present disclosure. As shown in FIG. 2, the method includes the following steps:

Step 201: Detect a quantity of uplink service packets of a terminal.

Step 202: Acquire an uplink service packet sending frequency of each terminal according to the quantity of uplink service packets of the terminal.

Step 203: Determine, according to the packet sending frequency, whether the terminal is in a service operating state, and if the terminal is in a service operating state, proceed to step 205; if the terminal is not in a service operating state, proceed to step 204.

Step 204: Ignore the terminal, and proceed to step 201.

Step 205: Acquire an air interface occupancy time ratio of the terminal.

Step 206: Determine whether the air interface occupancy time ratio of the terminal is less than a second threshold, and if the air interface occupancy time ratio of the terminal is less than the second threshold, proceed to step 207. If the air interface occupancy time ratio of the terminal is not less than the second threshold, proceed to step 208.

Step 207: Increase an uplink data sending threshold of the terminal, and proceed to step 201.

Step 208: Determine whether a channel idle rate is greater than or equal to a third threshold, and if the channel idle rate is greater than or equal to the third threshold, proceed to step 209; if the channel idle rate is less than the third threshold, proceed to step 210.

Step 209: Maintain an uplink data sending threshold of the terminal, and proceed to step 201.

Step 210: Decrease an uplink data sending threshold of the terminal, and detect an actual data sending rate of the terminal.

Step 211: Determine whether the actual data sending rate of the terminal is greater than or equal to the uplink data sending threshold, and if the actual data sending rate of the terminal is greater than or equal to the uplink data sending threshold, proceed to step 212. If the actual data sending rate of the terminal is less than the uplink data sending threshold, proceed to step 201.

Step 212: Perform discontinuous packet dropping on received data that is sent by the terminal, and send, to an upper layer protocol in a delayed manner, data that has undergone the discontinuous packet dropping.

Step 213: When the discontinuous packet dropping and a delay of the terminal are detected, negotiate with the terminal, so that the terminal decreases a data sending rate until an actual data sending rate of the terminal is less than or equal to the uplink data sending threshold, and proceed to step 201.

Figure 3:
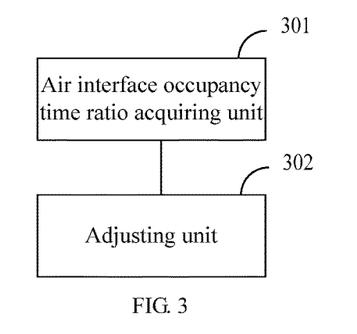
FIG. 3 is a schematic structural diagram of a contention adjustment apparatus in the present disclosure.

According to the method in this embodiment of the present disclosure, an uplink data sending threshold of a terminal is adjusted according to an air interface occupancy time ratio of the terminal, so as to adjust a demand of the terminal, thereby avoiding that a terminal with a stronger demand excessively preempts a terminal with a weaker demand, and improving using experience of users. Corresponding to the foregoing method embodiment, an embodiment of the present disclosure further provides a contention adjustment apparatus. FIG. 3 shows a schematic structural diagram of a contention adjustment apparatus according to an embodiment of the present disclosure. As shown in FIG. 3, the apparatus includes an air interface occupancy time ratio acquiring unit 301, configured to acquire an air interface occupancy time ratio of a terminal that is in a service operating state and an adjusting unit 302 configured to adjust an uplink data sending threshold of the terminal according to the air interface occupancy time ratio of the terminal. The air interface occupancy time ratio of the terminal is a ratio of an air interface occupancy time of the terminal to an air interface time the air interface occupancy time of the terminal is a ratio of a volume of data sent by the terminal to an air interface data sending rate of the terminal in the air interface time. The apparatus further includes a service packet detecting unit configured to detect a quantity of uplink service packets of each terminal and a packet sending frequency acquiring unit configured to acquire an uplink service packet sending frequency of each terminal according to the quantity of uplink service packets of each terminal. The uplink service packet sending frequency is a quantity of uplink service packets of the terminal in a unit time. The apparatus further includes a service status determining unit, configured to determine a service status of each terminal. If the packet sending frequency of the terminal is greater than or equal to a first threshold, the terminal is in a service operating state, and if the packet sending frequency of the terminal is less than the first threshold, the terminal is in a service shortage state.

The adjusting unit 302 is configured to increase the uplink data sending threshold of the terminal if the air interface occupancy time ratio of the terminal is less than a second threshold.

The adjusting unit 302 is configured to acquire a channel idle rate of the access point, and maintain or decrease the uplink data sending threshold of the terminal according to the channel idle rate of the access point if the air interface occupancy time ratio of the terminal is greater than or equal to the second threshold.

The adjusting unit 302 is configured to maintain the uplink data sending threshold of the terminal if the channel idle rate is greater than or equal to a third threshold.

The adjusting unit 302 is configured to decrease the uplink data sending threshold of the terminal if the channel idle rate is less than the third threshold. The apparatus further includes an actual data sending rate detecting unit configured to detect an actual data sending rate of the terminal and a processing unit, configured to compare the actual data sending rate of the terminal with the uplink data sending threshold. If the actual data sending rate of the terminal is greater than or equal to the uplink data sending threshold, the processing unit is further configured to perform discontinuous packet dropping on received data that is sent by the terminal, and send, to an upper layer protocol of the access point in a delayed manner, data that has undergone the discontinuous packet dropping. The apparatus further includes a rate decreasing unit, configured to detect the discontinuous packet dropping and a delay of the terminal. If the discontinuous packet dropping and the delay are detected, the rate decreasing unit is further configured to negotiate with the terminal so that the terminal decreases a data sending rate until an actual data sending rate of the terminal is less than or equal to the uplink data sending threshold.

According to the apparatus in this embodiment of the present disclosure, an uplink data sending threshold of a terminal is adjusted according to an air interface occupancy time ratio of the terminal, so as to adjust a demand of the terminal, thereby avoiding that a terminal with a stronger demand excessively preempts a terminal with a weaker demand, and improving using experience of users.

Figure 4:
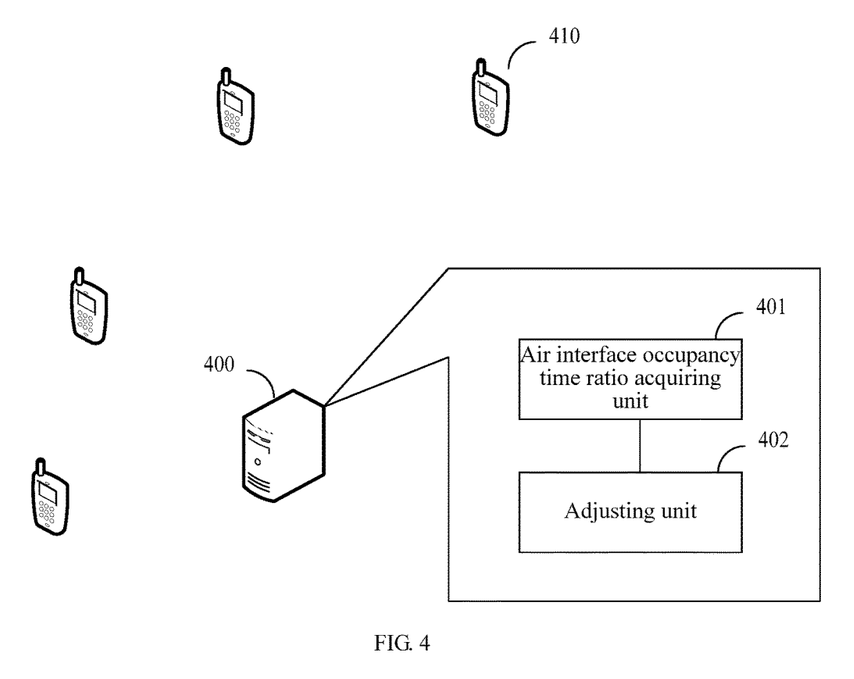
FIG. 4 is a schematic diagram of a wireless local area network system according to an embodiment of the present disclosure.

An embodiment of the present disclosure further provides a wireless local area network system. FIG. 4 shows a schematic diagram of a wireless local area network system according to an embodiment of the present disclosure. As shown in FIG. 4, the wireless local area network system includes a terminal 410 and a contention adjustment apparatus 400. The wireless local area network system may include multiple terminals 410. The contention adjustment apparatus 400 includes an air interface occupancy time ratio acquiring unit 401, configured to acquire an air interface occupancy time ratio of a terminal that is in a service operating state, and an adjusting unit 402, configured to adjust an uplink data sending threshold of the terminal according to the air interface occupancy time ratio of the terminal, where the air interface occupancy time ratio of the terminal is a ratio of an air interface occupancy time of the terminal to an air interface time, and the air interface occupancy time of the terminal is a ratio of a volume of data sent by the terminal to an air interface data sending rate of the terminal in the air interface time.

The apparatus further includes a service packet detecting unit, configured to detect a quantity of uplink service packets of each terminal, a packet sending frequency acquiring unit, configured to acquire an uplink service packet sending frequency of each terminal according to the quantity of uplink service packets of each terminal, where the uplink service packet sending frequency is a quantity of uplink service packets of the terminal in a unit time, and a service status determining unit, configured to determine a service status of each terminal. If the packet sending frequency of the terminal is greater than or equal to a first threshold, the terminal is in a service operating state. If the packet sending frequency of the terminal is less than the first threshold, the terminal is in a service shortage state.

The adjusting unit 402 is configured to increase the uplink data sending threshold of the terminal if the air interface occupancy time ratio of the terminal is less than a second threshold.

The adjusting unit 402 is configured to acquire a channel idle rate of the access point and maintain or decrease the uplink data sending threshold of the terminal according to the channel idle rate of the access point if the air interface occupancy time ratio of the terminal is greater than or equal to the second threshold.

The adjusting unit 402 is configured to maintain the uplink data sending threshold of the terminal if the channel idle rate is greater than or equal to a third threshold.

The adjusting unit 402 is configured to decrease the uplink data sending threshold of the terminal if the channel idle rate is less than the third threshold. The apparatus further includes an actual data sending rate detecting unit, configured to detect an actual data sending rate of the terminal, a processing unit, configured to: compare the actual data sending rate of the terminal with the uplink data sending threshold. If the actual data sending rate of the terminal is greater than or equal to the uplink data sending threshold, perform discontinuous packet dropping on received data that is sent by the terminal, and send, to an upper layer protocol of the access point in a delayed manner, data that has undergone the discontinuous packet dropping. The apparatus further includes a rate decreasing unit, configured to detect the discontinuous packet dropping and a delay of the terminal, and if the discontinuous packet dropping and the delay are detected, negotiate with the terminal, so that the terminal decreases a data sending rate until an actual data sending rate of the terminal is less than or equal to the uplink data sending threshold.

This embodiment of the present disclosure provides a wireless local area network system, which can adjust a demand of a terminal and avoid that a terminal with a stronger demand excessively preempts a terminal with a weaker demand, and can improve data transmission efficiency of an entire network, and improve performance of the entire network.

The embodiments of the present disclosure provide a contention adjustment method, apparatus, and system in a wireless local area network. In the method, apparatus, and system, an uplink data sending threshold of a terminal is periodically adjusted according to an air interface occupancy time ratio of the terminal, so as to adjust a demand of the terminal and avoid that a terminal with a stronger demand excessively preempts a terminal with a weaker demand. In addition, an air interface data sending rate of the terminal is adjusted, and an actual data sending rate of the terminal is also detected, which can avoid a situation in which a terminal with relatively high signal strength has a small actual data sending rate after obtaining, by means of contention, an opportunity for sending data, and can increase an actual data receiving rate of an AP, improve data transmission efficiency of an entire network, and improve performance of the entire network.

A person skilled in the art may clearly understand that technologies in the embodiments of the present disclosure may be implemented by software in addition to necessary universal hardware, where the universal hardware includes a universal integrated circuit, a universal central processing unit (CPU), a universal memory, a universal component, or the like, or may be implemented by universal hardware, including an application-specific integrated circuit, a dedicated CPU, a dedicated memory, a dedicated component, or the like. In most circumstances, the former is a preferred implementation manner. Based on such an understanding, the technical solutions in the embodiments of the present disclosure essentially or the part contributing to the prior art may be implemented in a form of a software product. The computer software product may be stored in a storage medium, such as a read-only memory (ROM), a random-access memory (RAM), a magnetic disk, or an optical disc, and includes several instructions for instructing a computer device, which may be a personal computer, a server, a network device or the like, to perform the methods described in the embodiments or some parts of the embodiments of the present disclosure.

The embodiments in this specification are all described in a progressive manner, for same or similar parts in the embodiments, reference may be made to each other, and each embodiment focuses on a difference from other embodiments. Especially, a system embodiment is basically similar to a method embodiment, and therefore is described briefly; for related parts, reference may be made to partial descriptions in the method embodiment.

The foregoing descriptions are implementation manners of the present disclosure, but are not intended to limit the protection scope of the present disclosure. Any modification, equivalent replacement, and improvement made without departing from the spirit and principle of the present disclosure shall fall within the protection scope of the present disclosure.

What is claimed is:

1. A contention adjustment method implemented by an access point in a wireless local area network, wherein the method comprises:
    acquiring an air interface occupancy time ratio of a terminal that is in a service operating state; and
    adjusting an uplink data sending threshold of the terminal according to the air interface occupancy time ratio of the terminal,
    wherein the air interface occupancy time ratio of the terminal is a ratio of an air interface occupancy time of the terminal to an air interface time,
    wherein the air interface occupancy time of the terminal is a ratio of a transmission data volume of the terminal to an air interface data sending rate of the terminal in the air interface time, and
    wherein adjusting the uplink data sending threshold of the terminal according to the air interface occupancy time ratio of the terminal comprises:
        determining whether the air interface occupancy time of the terminal is less than a second threshold;
        responsive to determining that the air interface occupancy time of the terminal is less than the second threshold, increasing the uplink data sending threshold of the terminal;
        responsive to determining that the air interface occupancy time of the terminal is not less than the second threshold, acquiring a channel idle rate of the access point; and
        responsive to determining that the air interface occupancy time of the terminal is not less than the second threshold, maintaining or decreasing the uplink data sending threshold of the terminal according to the channel idle rate of the access point.

2. The contention adjustment method according to claim 1, wherein before acquiring the air interface occupancy time ratio of the terminal that is in the service operating state, the contention adjustment method further comprises:
    detecting a first quantity of uplink service packets of the terminal;
    acquiring an uplink service packet sending frequency of the terminal according to the first quantity of uplink service packets of the terminal, wherein the uplink service packet sending frequency is a second quantity of uplink service packets of the terminal in a unit time; and
    determining a service status of the terminal by:
        determining that the terminal is in a service operating state when the uplink service packet sending frequency of the terminal is greater than or equal to a first threshold; and
        determining that the terminal is in a service shortage state when the uplink service packet sending frequency of the terminal is less than the first threshold.

3. The contention adjustment method according to claim 1, wherein maintaining or decreasing the uplink data sending threshold of the terminal according to the channel idle rate of the access point comprises:
    maintaining the uplink data sending threshold of the terminal when the channel idle rate is greater than or equal to a third threshold; and
    decreasing the uplink data sending threshold of the terminal when the channel idle rate is less than the third threshold.

4. The contention adjustment method according to claim 3, wherein after decreasing the uplink data sending threshold of the terminal, the contention adjustment method further comprises:
    detecting an actual data sending rate of the terminal;
    comparing the detected actual data sending rate of the terminal with the uplink data sending threshold;
    receiving data from the terminal after decreasing the uplink data sending threshold of the terminal;
    performing discontinuous packet dropping on the received data when the actual data sending rate of the terminal is greater than or equal to the uplink data sending threshold;
    sending, to an upper layer protocol of the access point in a delayed manner, data that has undergone the discontinuous packet dropping;
    detecting the discontinuous packet dropping and a delay of the terminal; and
    negotiating with the terminal when the discontinuous packet dropping and the delay are detected so that the terminal decreases a data sending rate until an actual data sending rate of the terminal is less than or equal to the uplink data sending threshold.

5. A contention adjustment apparatus in a wireless local area network, wherein the contention adjustment apparatus comprises:
a processor configured to:
acquire an air interface occupancy time ratio of a terminal that is in a service operating state; and
adjust an uplink data sending threshold of the terminal according to the air interface occupancy time ratio of the terminal,
wherein the air interface occupancy time ratio of the terminal is a ratio of an air interface occupancy time of the terminal to an air interface time,
wherein the air interface occupancy time of the terminal is a ratio of a transmission data volume of the terminal to an air interface data sending rate of the terminal in the air interface time, and
wherein the processor is further configured to:
determine whether the air interface occupancy time of the terminal is less than a second threshold;
responsive to determining that the air interface occupancy time of the terminal is less than the second threshold, increase the uplink data sending threshold of the terminal;
responsive to determining that the air interface occupancy time of the terminal is not less than the second threshold, acquire a channel idle rate of the access point; and
responsive to determining that the air interface occupancy time of the terminal is not less than the second threshold, maintain or decrease the uplink data sending threshold of the terminal according to the channel idle rate of the access point.

6. The contention adjustment apparatus according to claim 5, wherein the processor is further configured to:
detect a first quantity of uplink service packets of the terminal;
acquire an uplink service packet sending frequency of the terminal according to the first quantity of uplink service packets of the terminal, wherein the uplink service packet sending frequency is a second quantity of uplink service packets of the terminal in a unit time; and
determine a service status of the terminal by:
determining that the terminal is in a service operating state when the uplink service packet sending frequency of the terminal is greater than or equal to a first threshold; and
determining that the terminal is in a service shortage state when the uplink service packet sending frequency of the terminal is less than the first threshold.

7. The contention adjustment apparatus according to claim 5, wherein the processor is further configured to adjust the uplink data sending threshold by:
maintaining the uplink data sending threshold of the terminal when the channel idle rate is greater than or equal to a third threshold; and
decreasing the uplink data sending threshold of the terminal when the channel idle rate is less than the third threshold.

8. The contention adjustment apparatus according to claim 7, wherein the processor is further configured to:
detect an actual data sending rate of the terminal;
compare the actual data sending rate of the terminal with the uplink data sending threshold;
perform discontinuous packet dropping on received data that is sent by the terminal when the actual data sending rate of the terminal is greater than or equal to the uplink data sending threshold;
send, to an upper layer protocol of the access point in a delayed manner, data that has undergone the discontinuous packet dropping;
detect the discontinuous packet dropping and a delay of the terminal; and
negotiate with the terminal when the discontinuous packet dropping and the delay are detected so that the terminal decreases a data sending rate until an actual data sending rate of the terminal is less than or equal to the uplink data sending threshold.

9. A wireless local area network system, comprising:
a wireless terminal in a service operating state; and
a contention adjustment apparatus in communication with the wireless terminal and comprising a processor configured to:
acquire an air interface occupancy time ratio of the wireless terminal; and
adjust an uplink data sending threshold of the wireless terminal according to the air interface occupancy time ratio of the wireless terminal,
wherein the air interface occupancy time ratio of the wireless terminal is a ratio of an air interface occupancy time of the wireless terminal to an air interface time,
wherein the air interface occupancy time of the wireless terminal is a ratio of a transmission data volume of the wireless terminal to an air interface data sending rate of the wireless terminal in the air interface time, and
wherein the processor is further configured to:
determine whether the air interface occupancy time of the terminal is less than a second threshold;
responsive to determining that the air interface occupancy time of the terminal is less than the second threshold, increase the uplink data sending threshold of the terminal;
responsive to determining that the air interface occupancy time of the terminal is not less than the second threshold, acquire a channel idle rate of the access point; and
responsive to determining that the air interface occupancy time of the terminal is not less than the second threshold, maintain or decrease the uplink data sending threshold of the terminal according to the channel idle rate of the access point.

10. The wireless local area network system according to claim 9, wherein the processor is further configured to adjust the uplink data sending threshold of the wireless terminal by:
maintaining the uplink data sending threshold of the wireless terminal when the channel idle rate is greater than or equal to a third threshold; and
decreasing the uplink data sending threshold of the wireless terminal when the channel idle rate is less than the third threshold.

* * * * *